No. 706,611. Patented Aug. 12, 1902.
C. STONE.
VARIABLE SPEED GEARING.
(Application filed Dec. 21, 1901.)
(No Model.)
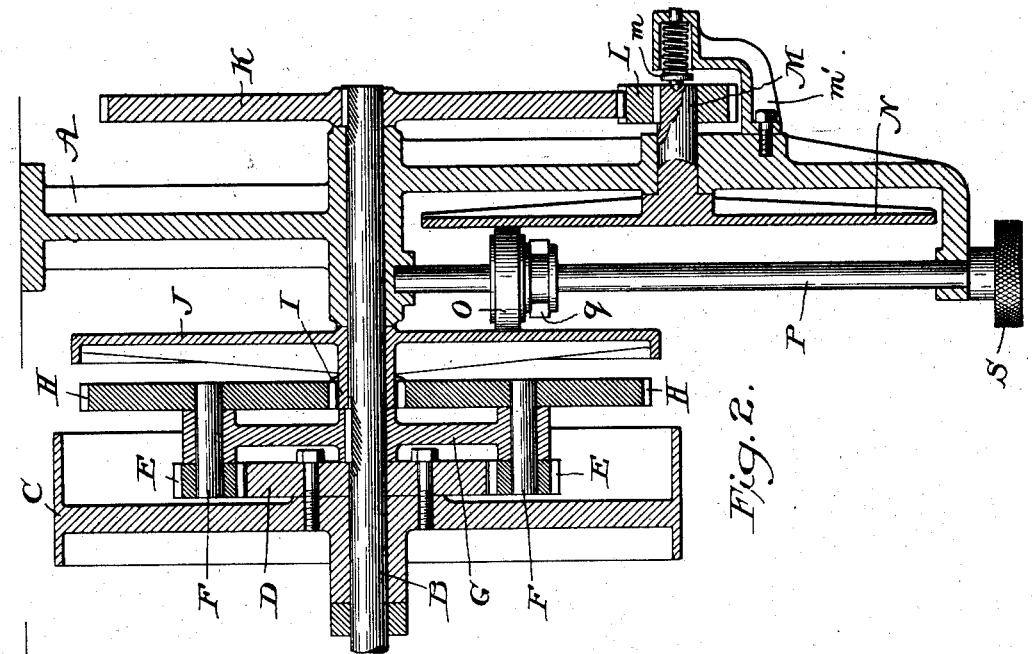
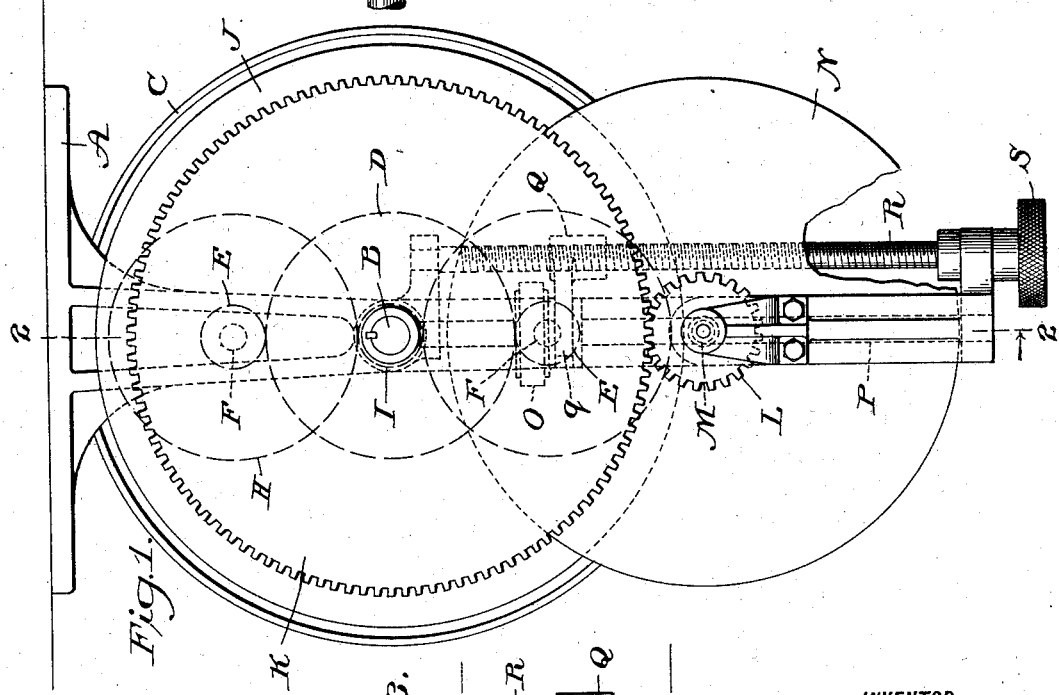
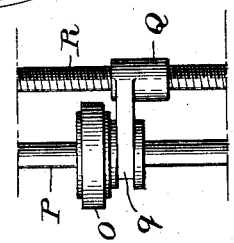
WITNESSES:
INVENTOR
Clarence Stone,
BY
ATTORNEY.

UNITED STATES PATENT OFFICE.

CLARENCE STONE, OF PHILADELPHIA, PENNSYLVANIA, ASSIGNOR OF ONE-HALF TO ALBERT R. GREVER, OF PHILADELPHIA, PENNSYLVANIA.

VARIABLE-SPEED GEARING.

SPECIFICATION forming part of Letters Patent No. 706,611, dated August 12, 1902.

Application filed December 21, 1901. Serial No. 86,758. (No model.)

*To all whom it may concern:*

Be it known that I, CLARENCE STONE, a citizen of the United States, residing in the city and county of Philadelphia and State of Pennsylvania, have invented certain new and useful Improvements in Variable-Speed Gearing, of which the following is a full, clear, and exact description, reference being had to the accompanying drawings, forming a part of this specification.

This invention relates to variable-speed gearing, my object being to provide a simple and efficient construction and organization of mechanism whereby a wide range of variation in speed may be readily attained, as will be hereinafter particularly described and claimed.

In the drawings, Figure 1 is an end elevation of my improved gearing, a part of one of the friction-wheels being broken away. Fig. 2 is a longitudinal vertical section, as on the line 2 2 of Fig. 1. Fig. 3 is a detail of the adjustable friction-disk.

A represents a hanger, and B a counter-shaft journaled therein and driven from a suitable source of power. On this shaft is loosely mounted a pulley C, (or other transmitting device,) on one side of which, concentric therewith, is affixed a spur-wheel D. Coacting with the teeth of this wheel are pinions E, which are carried by stud-shafts F, having their bearings in a supporting-wheel G, keyed on the counter-shaft. The stud-shafts also carry spur-wheels H, which gear with a pinion I, formed on the hub of a friction-wheel J, that is loosely mounted on the counter-shaft, the said wheel and pulley thus being connected by planetary gearing. On the shaft B is keyed a large spur-wheel K, which gears with a pinion L on the outer end of a stud-shaft M, having its bearings in the hanger on a plane beyond the periphery of the friction-wheel. This stud-shaft carries on its inner end a friction-wheel N. Acting on the opposing faces of the two friction-wheels is a friction-disk O, having provision for its radial adjustment in respect to such faces, as follows: The disk is loosely mounted on a vertical shaft P, which is supported at its respective ends in the hanger. The hub of the wheel is circumferentially grooved to receive the U-shaped extension $q$ of a nut Q, which is applied to a vertically-disposed screw R, journaled at its ends in the hanger. The lower end of this screw is provided with a milled head S, whereby the screw may be readily turned in either direction to adjust the nut up or down thereon, and thus correspondingly move the disk along the shaft P.

In the present instance the stud-shaft M, carrying the wheel N and pinion L, is longitudinally movable in its bearing, and a spring-pressed stud $m$, supported in a laterally-disposed bracket $m'$ on the hanger bears centrally against the opposing end of the stud in a manner to press the latter yieldingly inward, and thus maintain the said wheel against the friction-disk.

The operation is as follows: Assuming the counter-shaft to be driven, the wheel G, revolving therewith, will rotate the shafts F and the gears thereon about the axis of the counter-shafts. The pinions will roll upon the spur-wheel D of the pulley, and therefore if such pinions be revolved about their own axes the said spur-wheel, and perforce the pulley, will be rotated thereby, the speed of the pulley being governed by the axial speed of rotation of the pinions. Such rotation of the pinions is effected and controlled by the action upon the spur-wheels H of the pinion I of the friction-wheel J, the speed of the spur-wheels being increased or diminished accordingly as the speed of the pinions may be varied. The power is positively transmitted from the counter-shaft, through the gears K and L, to the friction-wheel N, and thence through the disk O to the friction-wheel J, carrying the pinion I. It follows, therefore, that as the said disk is adjusted from or toward the axis of the wheel N the speed of the wheel J is varied, thereby regulating to a nicety the speed of the pulley.

I claim—

1. In a variable-speed gearing, the combination with a power-shaft and a pulley thereon, of a friction-wheel on said shaft, planetary gearing between said wheel and pulley, a second friction-wheel, gearing between the latter and the counter-shaft, a friction-disk interposed between the faces of said friction-wheels, and means for adjusting said disk radially in respect to said wheels, substantially as described.

2. In variable-speed gearing, the combination with a power-shaft and a pulley thereon, of a gear-wheel on said pulley, pinions coacting with said gear-wheel, and shafts for said pinions, a support for said stud-shafts affixed to the power-shaft, spur-wheels on said stud-shafts, a friction-wheel loose on the power-shaft, the hub of said wheel including a pinion in gear with the spur-wheels last named, a spur-wheel fast on the power-shaft, a pinion in gear therewith, a shaft for said pinion, a friction-wheel on the latter shaft, a friction-disk interposed between the faces of said friction-wheels, and means for adjusting said disk radially in respect to said wheels, substantially as described.

3. In variable-speed gearing, the combination with a power-shaft and a pulley thereon, of a friction-wheel on said shaft, planetary gearing between said wheel and pulley, a second friction-wheel, gearing between the latter and the counter-shaft, a friction-disk interposed between the faces of said friction-wheels, a shaft for said disk, a screw-shaft a nut thereon, and a connection between said nut and disk, substantially as described.

In testimony whereof I have hereunto affixed my signature in the presence of two subscribing witnesses.

CLARENCE STONE.

Witnesses:
ANDREW V. GROUPE,
JOHN R. NOLAN.